(12) United States Patent
Vogt et al.

(10) Patent No.: US 12,126,515 B2
(45) Date of Patent: Oct. 22, 2024

(54) METHOD FOR INCREASING A QUALITY OF SAMPLED RECEIVE SIGNALS AND MEASURING DEVICE FOR TIME DOMAIN REFLECTOMETRY

(71) Applicant: KROHNE S.A.S., Romans sur Isère (FR)

(72) Inventors: Michael Vogt, Bochum (DE); Vincent Pichot, Romans-sur-Isère (FR); Vincent Milhaud, Valence (FR)

(*) Notice: Subject to any disclaimer, the term of this patent is extended or adjusted under 35 U.S.C. 154(b) by 227 days.

(21) Appl. No.: 17/818,796

(22) Filed: Aug. 10, 2022

(65) Prior Publication Data
US 2023/0057882 A1 Feb. 23, 2023

(30) Foreign Application Priority Data
Aug. 10, 2021 (DE) ...................... 10 2021 120 821.1

(51) Int. Cl.
*H04L 43/12* (2022.01)
(52) U.S. Cl.
CPC .................................... *H04L 43/12* (2013.01)
(58) Field of Classification Search
CPC ....................................................... H04L 43/12
USPC .......................................................... 375/224
See application file for complete search history.

(56) References Cited

U.S. PATENT DOCUMENTS

| | | |
|---|---|---|
| 7,145,349 B1 | 12/2006 | Cramer et al. |
| 7,710,125 B2 | 5/2010 | Schultheiss et al. |
| 2008/0024145 A1 | 1/2008 | Schultheiss et al. |
| 2012/0095726 A1* | 4/2012 | Burcea .................. G01S 13/103 702/159 |
| 2015/0253175 A1 | 9/2015 | Jirskog et al. |
| 2017/0370761 A1 | 12/2017 | Seiler et al. |
| 2019/0107428 A1* | 4/2019 | Vogt ...................... G01F 23/284 |

FOREIGN PATENT DOCUMENTS

| | | |
|---|---|---|
| DE | 19949992 A1 | 5/2001 |
| DE | 102015100555 A1 | 7/2016 |
| EP | 3467451 A1 | 4/2019 |
| WO | 2008012029 A1 | 1/2008 |

\* cited by examiner

*Primary Examiner* — Kevin M Burd
(74) *Attorney, Agent, or Firm* — Patrick D. Duplessis

(57) ABSTRACT

A method for increasing a quality of sampled receive signals includes: generating a plurality of sampling signal repetition rates with a running variable; determining a receive signal repetition rate associated with each of the sampling signal repetition rates; generating a receive signal sequence consisting of the receive signals; generating a sampling signal sequence consisting of the sampling signals; generating a mixed signal sequence; low-pass filtering the mixed signal sequence; determining a quality indicator of the low-pass filtered mixed signal sequence; selecting a quality indicator which exceeds a predetermined quality threshold from the determined quality indicators; and using the sampling signal repetition rate and the receive signal repetition rate associated therewith. A related measuring device is also disclosed.

9 Claims, 3 Drawing Sheets

METHOD FOR INCREASING A QUALITY OF SAMPLED RECEIVE SIGNALS AND MEASURING DEVICE FOR TIME DOMAIN REFLECTOMETRY

TECHNICAL FIELD

In one aspect, the invention relates to a method for increasing a quality of sampled receive signals comprising a signal processing device. The signal processing device has a controller, a receive signal generator, a sampling signal generator for generating sampling signals $s_A$, a mixer, and a low-pass filter having a low-pass cut-off frequency $f_{T,G}$. The receive signal generator is adapted to generate receive signals $s_E$ having an upper receive signal cut-off frequency $f_{E,G}$. In another aspect, the invention relates to a measuring device for time domain reflectometry having a signal processing device.

BACKGROUND

The signal processing device of the measuring device has a controller, a receive signal generator, a sampling signal generator for generating sampling signals $s_A$, a mixer, and a low-pass filter having a low-pass cut-off frequency $f_{T,G}$. The receive signal generator is designed to generate receive signals $s_E$ with an upper receive signal cut-off frequency $f_{E,G}$.

The receive signal generator has a transmit signal generator for generating and transmitting transmit signals $s_S$ and a measuring probe.

The measuring probe is designed for guiding the transmit signals $s_S$ and the receive signals $s_E$ and for generating the receive signals $s_E$ by reflection of the transmit signals $s_S$ at a transition of the measuring probe to a medium. The transition of the measuring probe to the medium is created, for example, by the measuring probe being partially immersed in the medium.

The method described below is known from the prior art. The method is executed, for example, by the measuring device during operation. Accordingly, the measuring device is designed to execute this method.

The receiving signal generator is triggered by the controller with a receive signal repetition rate $f_{E,W}$, whereby a receive signal sequence consisting of the receive signals $s_E$ is generated. The receive signals are generated by the receive signal generator. Namely, one of the receive signals is generated by each triggering. Further, the controller triggers the sampling signal generator at the sampling signal repetition rate $f_{A,W}$, thereby generating a sampling signal sequence consisting of the sampling signals $s_A$. The sampling signals are generated by the sampling signal generator. Namely, one of the sampling signals is generated by each triggering. Accordingly, the receive signals follow one another in the receive signal sequence at the receive signal repetition rate and the sampling signals follow one another in the sampling signal sequence at the sampling signal repetition rate. The receive signal sequence and the sampling signal sequence are mixed by the mixer, whereby the receive signals are sampled with the sampling signals to provide sampled receive signals, and a mixed signal sequence is produced. The mixed signal sequence has mixed products of the receive signals and the sampling signals.

The receive signals $s_E$, in particular a receive signal bandwidth of the receive signals, the receive signal repetition rate $f_{E,W}$, the sampling signals $s_A$ and the sampling signal repetition rate $f_{A,W}$ are selected in such a way that one of the mixed products in the mixed signal sequence lies at least substantially in a passband of the low-pass filter. The passband is determined by the lowpass cut-off frequency $f_{T,G}$. This mixed product has the receive signals and is then digitized, for example, by an analog-to-digital converter. Digitized receive signals are then present. The digitized receive signals are evaluated, for example, by an evaluation device.

The controller of the measuring device is designed, for example, to determine a position of the reflection of the transmitted signals, which generates the receive signals, along the measuring probe from a signal transit time. The signal transit time is, for example, a time interval between one of the transmit signals and the receive signal caused by it. In this case, the receive signals are used in the mixed product, which is at least substantially in the passband of the low-pass filter.

However, the receive signals are often superimposed by interference signals. The superposition occurs, for example, by radiating the interference signals into the receive signal generator. The interference signals superimposed on the receive signals are then also contained in the mixed product, which lies at least substantially in the passband of the lowpass filter. This applies to interference signals with a frequency $f_D$ that satisfies the condition $|f_D - n \cdot f_A| \leq f_{T,G}$ with $n \in \mathbb{N}_0$. An interference signal can also have several frequencies that satisfy this condition. Interference signals with frequencies satisfying this condition are considered narrowband. These interference signals overlap the receive signals and in this way reduce a quality of the sampled receive signals.

SUMMARY

Thus, one object of the present invention is to provide a method and a measuring device of the described type which increase a quality of the sampled receive signals in the passband of the low-pass filter when simultaneously receiving interference signals.

Firstly, the object is achieved by a method having the disclosed features.

Namely, a set $I \subset \mathbb{N}$ and a plurality of sampling signal repetition rates $f_{A,W,i}$ with a running variable i for all $i \in I$ are generated by the controller. Accordingly, the set I is a subset of the natural numbers $\mathbb{N}$ and i successively takes the values of all elements in the set I. The set of natural numbers is {1, 2, 3, 4, ... }. The number of sampling signal repetition rates is equal to the number of elements in the set I.

Further, a receive signal repetition rate associated with each of the sampling signal repetition rates $f_{A,W,i}$ is determined by the controller with a factor $c = f_{E,G}/(f_{E,G} - f_{T,G})$ either according to $f_{E,W,i} \approx c \cdot f_{A,W,i}$ or according to $f_{E,W,i} \approx 1/c \cdot f_{A,W,i}$ with $f_{E,W,i} \neq f_{A,W,i}$. Accordingly, the sampling signal repetition rates for all $i \in I$ are determined either according to $f_{E,W,i} \approx c \cdot f_{A,W,i}$ or according to $f_{E,W,i} \approx 1/c \cdot f_{A,W,i}$. The factor c is greater than zero. In principle, the specified approximation is sufficient. However, either $f_{E,W,i} = c \cdot f_{A,W,i}$ or $f_{E,W,i} = 1/c \cdot f_{A,W,i}$ is preferred.

Then, the following steps are performed for all $i \in I$:
- Generation of a receive signal sequence $s_{E,F,i}$ consisting of the receive signals $s_E$. This is done in that the receive signal generator is triggered with the receive signal repetition rate $f_{E,W,i}$ by the controller.
- Generation of a sampling signal sequence $s_{A,F,i}$ consisting of the sampling signals $s_A$. This is done in that the sampling signal generator is triggered with the sampling signal repetition rate $f_{A,W,i}$ by the controller.

Generation of a mixed signal sequence $s_{M,F,i}$. This is done in that the receive signal sequence $s_{E,F,i}$ and the sampling signal sequence $s_{A,F,i}$ are mixed with one another by the mixer. Preferably, the requirement $f_{E,W,i} \neq f_{A,W,i}$ is met by $f_{E,W,i} > f_{A,W,i}$. The mixer is then a downward mixer and in this case then in unison. However, the requirement $f_{E,W,i} \neq f_{A,W,i}$ can also be met by $f_{E,W,i} < f_{A,W,i}$.

Low-pass filtering of the mixed signal sequence $s_{M,F,i}$ by the low-pass filter. As has been pointed out, one of the mixing products in the mixed signal sequence is located at least substantially in the passband of the low-pass filter.

Determination of a quality indicator $Q_i$ of the low-pass filtered mixed signal sequence $s_{M,F,i}$ from the controller. Accordingly, the quality indicator is determined for the mixed product, i.e. the sampled receive signal, which is at least substantially in the passband of the low-pass filter.

After performing the above steps for all $i \in I$, there is now a number of triples corresponding to the number of elements in the set I. The i-th triple consists of the quality indicator $Q_i$, the receive signal repetition rate $f_{E,W,i}$ and the sampling signal repetition rate $f_{A,W,i}$.

Then, the controller selects a quality indicator $Q_i$ from the determined quality indicators, $i=k \in I$, that exceeds a predetermined quality threshold. Preferably, the quality indicator $Q_i$ with the highest quality is selected. For example, the quality threshold is given to the controller. Further, the sampling signal repetition rate $f_{A,W,i}$ and the receive signal repetition rate $f_{E,W,i}$ associated with this quality indicator $Q_i$ are subsequently used. Accordingly, the sampling signal repetition rate and the receive signal repetition rate from the $k^{th}$ triple are used.

The controller triggers both the receive signal generator and the sampling signal generator, as has been described previously. To transmit a receive trigger signal at the receive signal repetition rate from the controller to the receive signal generator, there is a receive trigger signal path between the controller and the receive signal generator. The receive trigger signal is generated by the controller and triggers the receive signal generator. To transmit a sampling trigger signal at the sampling signal repetition rate from the controller to the sampling signal generator, there is a sampling trigger signal path between the controller and the sampling signal generator. The sampling trigger signal is generated by the controller and triggers the sampling signal generator.

The controller determines the $Q_i$ quality indicators from the low-pass filtered mixed signal sequence. To transmit the low-pass filtered mixed signal sequence from the low-pass filter to the controller, there is a mixed signal path between the low-pass filter and the controller.

The method according to the invention has the advantage over the described method known from the prior art that when the sampling signal repetition rate $f_{A,W,i}$ and the receive signal repetition rate $f_{E,W,i}$ with i=k are used, the interference signal in the mixed product which is at least substantially in the passband of the low-pass filter is either no longer present or at least reduced. As a result, the quality of the sampled receive signals in the passband of the low-pass filter is increased. It is not necessary to change the low-pass cut-off frequency $f_{T,G}$ of the low-pass filter, which is why a low-pass filter with a constant low-pass cut-off frequency can be used.

In one design of the method, the sampling signal repetition rates are determined by the controller as described below. First, a starting sampling signal repetition rate $f_{A,W,0}$ and an interpolation factor $N \in \{\mathbb{N} \geq 3\}$ are predetermined. For example, they are stored in the controller. Then, a set $I=\{i:i \in \{1, \ldots, N\} \subset I$ and $(i+N) \in \mathbb{P}\}$ is determined. While to the left of the equal sign is the new set I, to the right of the equal sign is the previous set I. The new set I satisfies two conditions. One is the condition that i is an element of both the set $\{1, \ldots, N\}$ and the previous set I. Second, the condition that (i+N) is a prime number. Then, the sampling signal repetition rates are determined according to $f_{A,W,i} = f_{A,W,0} (1+(i-1)/N)$ for all $i \in I$. In a further development of this design, the sampling signal repetition rates are determined only for a subset of the set I.

In a design alternative to the previous design, the sampling signal repetition rates are determined by the controller as described below. First, a starting sampling signal repetition rate $f_{A,W,0}$ and an interpolation factor $N \in \{\mathbb{N} \geq 3$ and $N \in \mathbb{P}\}$ are predetermined. Thus, the interpolation factor must be greater than or equal to 3 and also a prime number. For example, they are stored in the controller. Then a set $I=\{i:i \in \{1, \ldots, N\} \subseteq I\}$ is determined. While to the left of the equal sign is the new set I, to the right of the equal sign is the previous set I. The new set I satisfies one condition. Namely, that i is an element of both the set $\{1, \ldots, N\}$ and the previous set I. Then, the sampling signal repetition rates are determined according to $f_{A,W,i} = f_{A,W,0} (1+(i-1)/N)$ for all $i \in I$. In a further development of this design, the sampling signal repetition rate is only determined for a subset of set I.

In a further design, each of the receive signals $s_E$ is a pulse, preferably a broadband pulse and particularly preferably a Dirac pulse. In one design, each of the sampling signals $s_A$ is a pulse, preferably a broadband pulse and particularly preferably a Dirac pulse. Accordingly, a Dirac pulse is a broadband pulse that approximates an ideal Dirac pulse within the limits of technical possibility.

In a further embodiment, each of the quality indicators $Q_i$ is a signal-to-noise ratio of the low-pass filtered mixed signal sequence.

In one design, the receive signal generator comprises a transmit signal generator for generating and transmitting transmit signals $s_S$ and a measuring probe. The measuring probe is designed for guiding the transmit signals $s_S$ and the receive signals $s_E$ and for generating the receive signals $s_E$ by reflection of the transmit signals $s_S$ at a transition of the measuring probe to a medium. Accordingly, the transmit signals are generated and transmitted by the transmit signal generator. The transmit signals are first guided by the measuring probe to the transition at which the receive signals are generated by reflection, and then the receive signals are guided back via the measuring probe. Accordingly, triggering the receive signal generator means triggering the transmit signal generator.

In a further design, the receive signal $s_E$ is generated by the receive signal generator by generating and transmitting a transmit signal $s_S$ and generating the receive signal $s_E$ by a reflection of the transmit signal $s_S$ at a transition.

In addition, the object is also achieved by a measuring device having the disclosed features.

Namely, the controller is designed to:

generate a set $I \subset \mathbb{N}$ and a plurality of sampling signal repetition rates $f_{A,W,i}$ with a running variable i for all $i \in I$.

determine a receive signal repetition rate associated with each of the sampling signal repetition rates $f_{A,W,i}$ with a factor $c = f_{E,G}/(f_{E,G} - f_{T,G})$ either according to $f_{E,W,i} \approx c \cdot f_{A,W,i}$ or according to $f_{E,W,i} \approx 1/c \cdot f_{A,W,i}$ with $f_{E,W,i} \neq f_{A,W,i}$.

Further, the controller is configured for all i∈I:
- to generate a receive signal sequence $s_{E,F,i}$ consisting of the receive signals $s_E$ by triggering the receive signal generator with the receive signal repetition rate $f_{E,W,i}$.
- to generate a sampling signal sequence $s_{A,F,i}$ consisting of the sampling signals $s_A$ by triggering the sampling signal generator with the sampling signal repetition rate $f_{A,W,i}$.
- to determine a quality indicator $Q_i$ from a mixed signal sequence $s_{M,F,i}$ low-pass filtered by the low-pass filter. Here, the mixed signal sequence is generated by the mixer by mixing the receive signal sequence $s_{E,F,i}$ and the sampling signal sequence $s_{A,F,i}$. Accordingly, the mixer is designed to generate the mixed signal sequence by mixing the receive signal sequence and the sampling signal sequence with each other. Further, the low-pass filter is configured to low-pass filter the mixed signal sequence.

Further, the controller is designed to then select, from the determined quality indicators, a quality indicator $Q_i$ that exceeds a predetermined quality threshold, and to subsequently use the sampling signal repetition rate $f_{A,W,i}$ and the receive signal repetition rate $f_{E,W,i}$ associated therewith.

During operation, the measuring device is operated according to its described design. Accordingly, it executes a method according to its design.

In one design of the measuring device, it is provided that the controller is configured to execute one of the described methods.

In a further design, it is provided that the measuring device is a fill level measuring device, and the measuring probe is a fill level measuring probe.

In all other respects, the remarks in respect to the method apply accordingly to the measuring device and vice versa.

BRIEF DESCRIPTION OF THE DRAWINGS

In detail, there is a plurality of possibilities for designing and further developing the method and the measuring instrument. For this, reference is made to the following description of a preferred embodiment in conjunction with the drawings.

DETAILED DESCRIPTION

Figure 1:
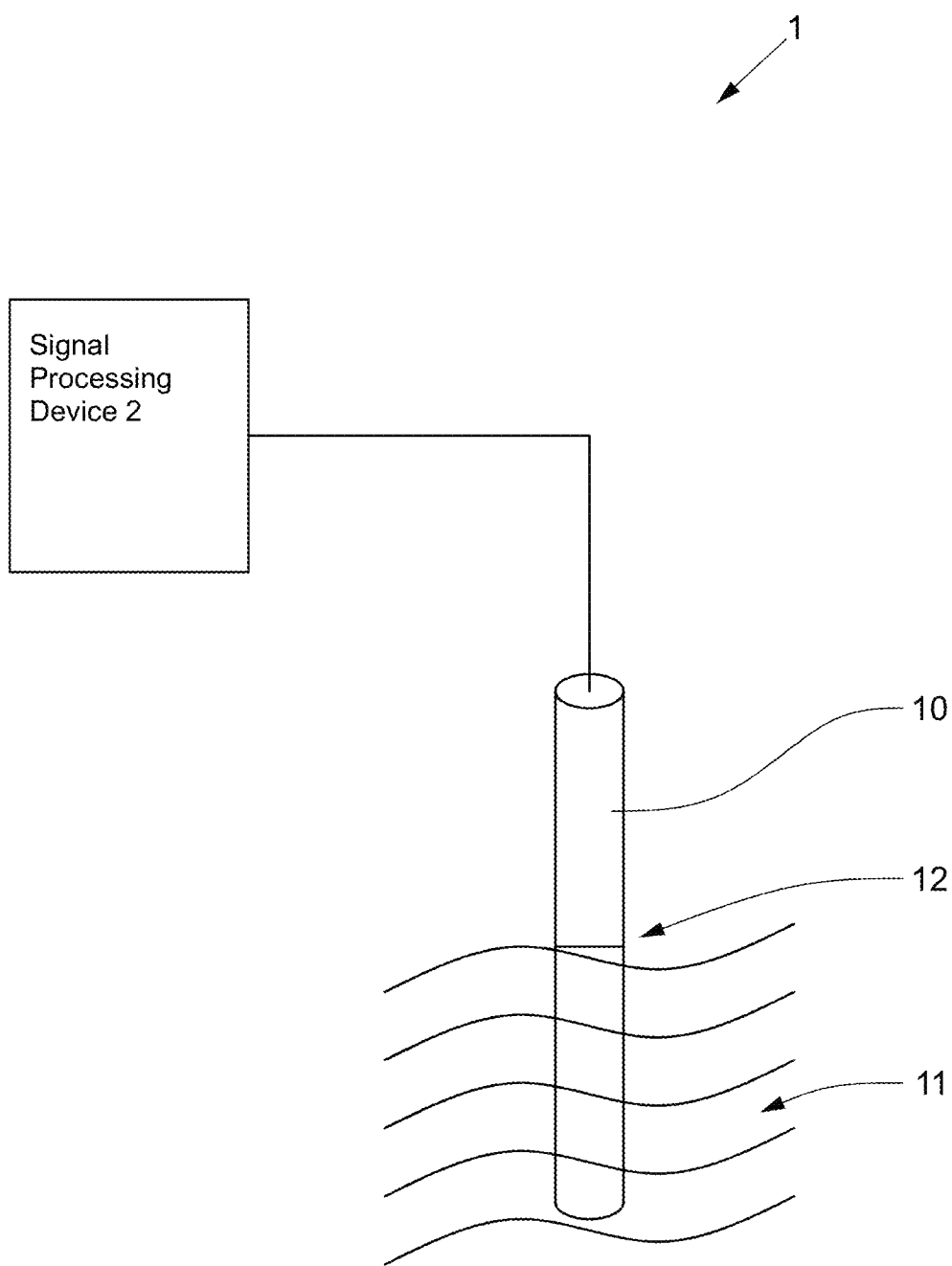
FIG. 1 illustrates an embodiment of a measuring device for time domain reflectometry.
Figure 2:
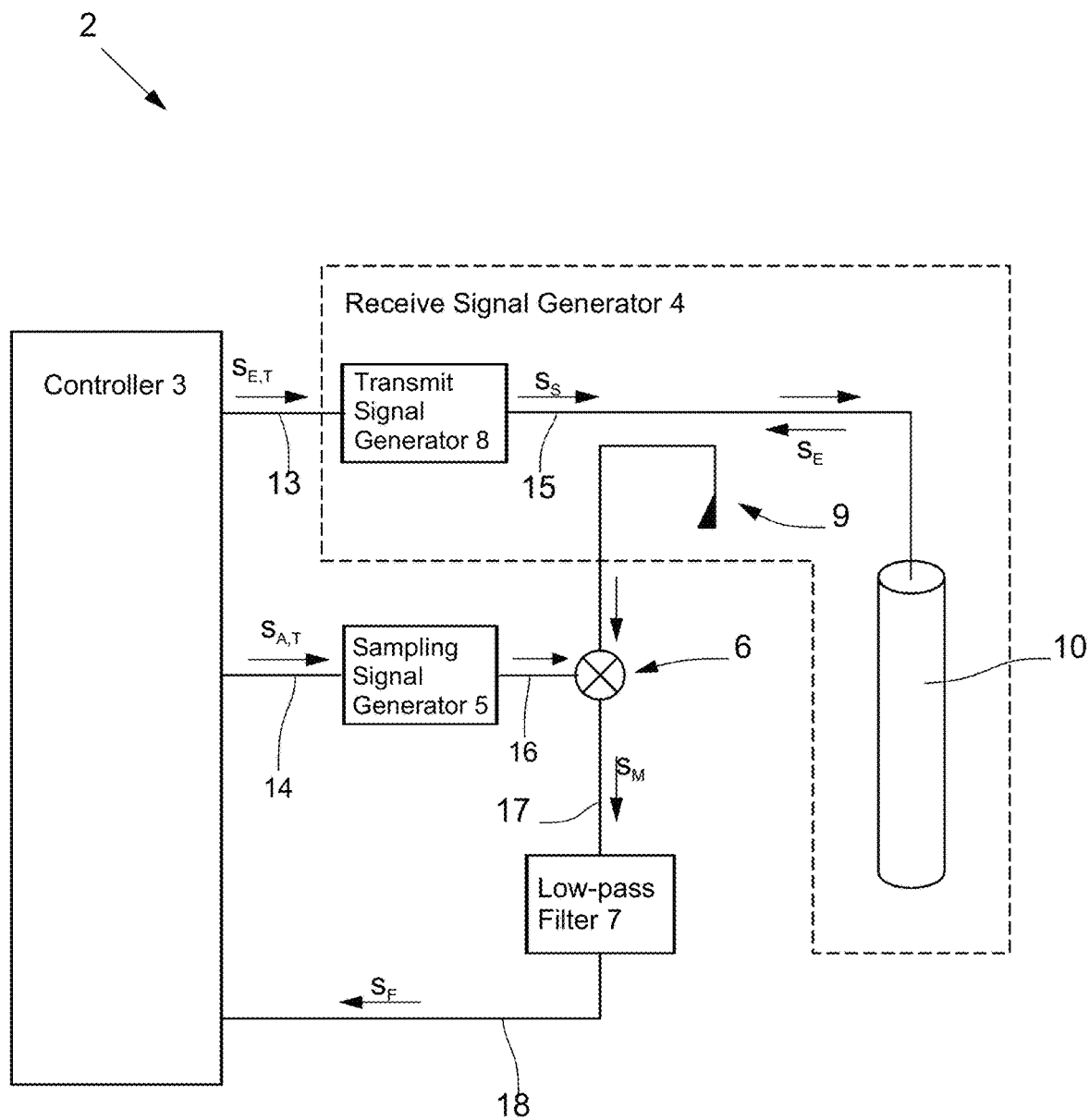
FIG. 2 illustrates an embodiment of a signal processing device of the measuring device.
Figure 3:
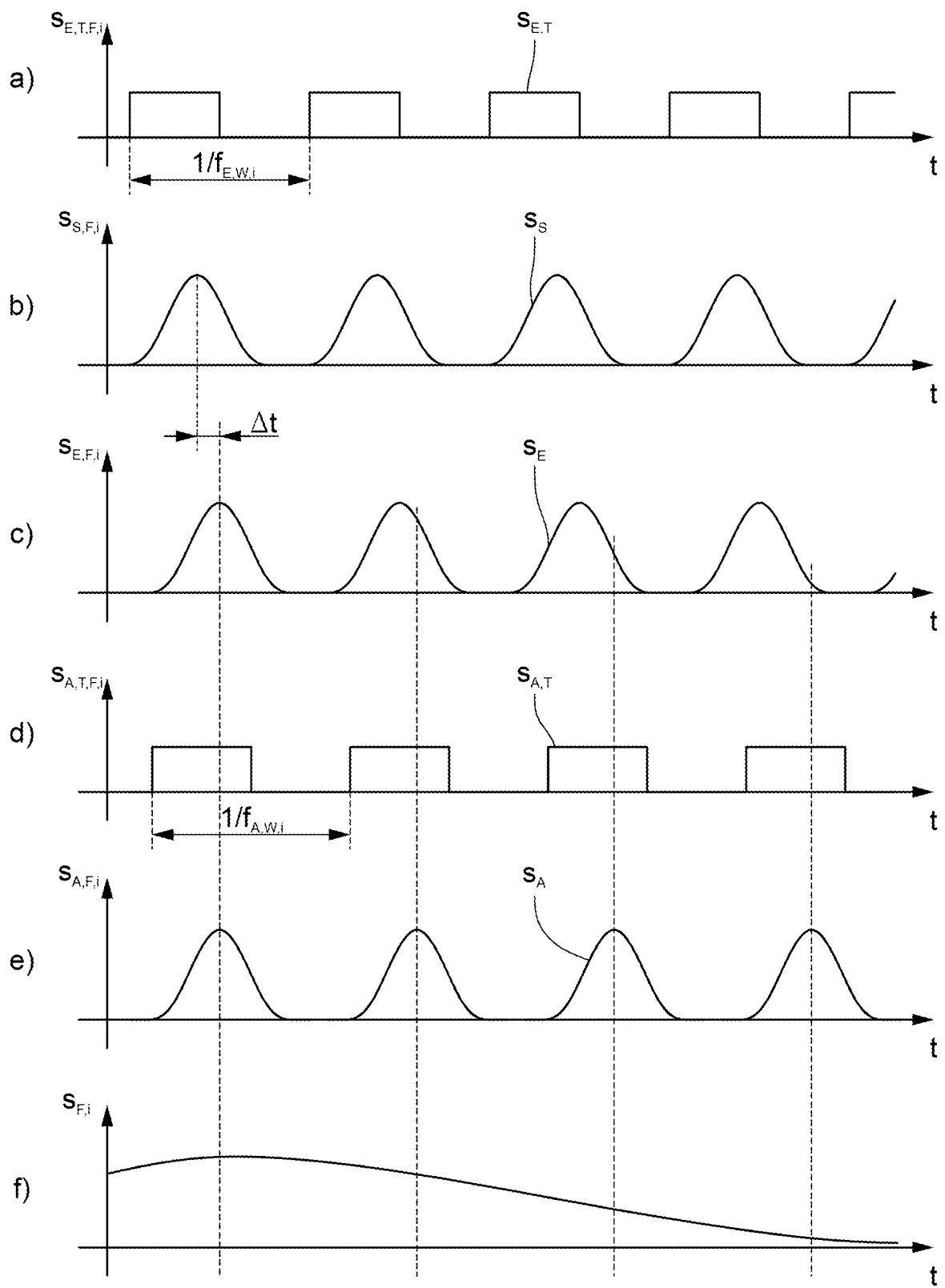
FIG. 3 illustrates examples of signal waveforms of the signal processing device over time.

FIG. 1 shows a measuring device 1 for time domain reflectometry and FIG. 2 shows an embodiment of a signal processing device 2 of the measuring device 1. FIG. 3 represents signals of the signal processing device 2 over time. The representation of the signals over time is qualitative. In particular, the representation of time is not to scale.

The signal processing device 2 has a controller 3, a receive signal generator 4, a sampling signal generator 5 for generating sampling signals $s_A$, namely in the form of Dirac pulses, a mixer 6 and a low-pass filter 7 with a low-pass cut-off frequency $f_{T,G}=8$ kHz. The receive signal generator 4 is designed to generate receive signals $s_E$ with an upper receive signal cut-off frequency $f_{E,G}=2$ GHz.

The receive signal generator 4 has a transmit signal generator 8 for generating and transmitting transmit signals $s_S$, namely in the form of Dirac pulses, a coupler 9 and a measuring probe 10. Each of the transmit signals $s_S$ is a Dirac pulse, and therefore each of the receive signals $s_E$ is also a Dirac pulse. The measuring probe 10 is partially immersed in a medium 11. The medium 11 has a fill level in a container which is not shown. The measuring probe 10 is configured to guide the transmit signals $s_S$ and the receive signals $s_E$ and to generate the receive signals by reflection of the transmit signals at a transition 12 between the measuring probe 10 and the medium 11. Accordingly, in this embodiment, the measuring device 1 is a level measuring device and the measuring probe 10 is a level measuring probe.

The controller 3 is designed to generate a set $I \subset \mathbb{N}$ and a plurality of sampling signal repetition rates $f_{A,W,i}$ with a running variable i for all i∈I and, in this embodiment, to determine a receive signal repetition rate associated with each of the sampling signal repetition rates $f_{A,W,i}$ according to $f_{E,W,i}=(f_{A,W,i} \cdot f_{E,G})/(f_{E,G}-f_{T,G})$ with $f_{E,W,i}>f_{A,W,i}$.

Further, the controller 3 is designed to determine for all i∈I a receive signal sequence $s_{E,F,i}$ consisting of the receive signals $s_E$ by triggering the receive signal generator 4 with the receive signal repetition rate $f_{E,W,i}$, a sampling signal sequence $s_{A,F,i}$ consisting of the sampling signals $s_A$ by triggering the sampling signal generator 5 with the sampling signal repetition rate $f_{A,W,i}$, and a quality indicator $Q_i$ from a mixed signal sequence sM,i low-pass filtered by the low-pass filter 7. Here, the mixed signal sequence sM,i is generated by the mixer 6 by mixing the receive signal sequence $s_{E,F,i}$ and the sampling signal sequence $s_{A,F,i}$ with each other. Each of the quality indicators $Q_i$ is a signal-to-noise distance of the low-pass filtered mixed signal sequence, which is also referred to as $s_{F,i}$.

During operation of the measuring device 1, the controller 3 triggers both the receive signal generator 4 and the sampling signal generator 5. Triggering the receive signal generator 4 triggers the transmit signal generator 8. To transmit a receive trigger signal $s_{E,T}$ at the receive signal repetition rate $f_{E,W,i}$ from the controller 3 to the transmit signal generator 8, there is a receive trigger signal path 13 between the controller 3 and the transmit signal generator 8. The receive trigger signal $s_{E,T}$ is generated by the controller 3 and triggers the transmit signal generator 8. To transmit a sampling trigger signal $s_{A,T}$ at the sampling signal repetition rate $f_{A,W,i}$ from the controller 3 to the sampling signal generator 5, there is a sampling trigger signal path 14 between the controller 3 and the sampling signal generator 5. The sampling trigger signal $s_{A,T}$ is generated by the controller 3 and triggers the sampling signal generator 5.

Further, there is a signal path 15 between the signal generator 8 and the measuring probe 10. The transmit signals $s_S$ are transmitted from the transmit signal generator 8 to the measuring probe 10 via the signal path 15 and the receive signals $s_E$ are transmitted in the opposite direction. The coupler 9 decouples the receive signals $s_E$ from the signal path 15 and guides them to the mixer 6. There is a sampling signal path 16 between the sampling signal generator 5 and the mixer 6 for the transmission of the sampling signals $s_A$ from the sampling signal generator 5 to the mixer 6. There is a mixer signal path 17 for the transmission of the mixer signal sequence $s_M$ from the mixer 6 to the low-pass filter 7. The controller 3 determines the quality indicators $Q_i$ from the low-pass filtered mixer signal sequence 5F. There is a low-pass signal path 18 from the low-pass filter 7 to the controller 3 for transmission of the low-pass filtered mixed signal sequence 5F.

During operation, the measuring device 1 executes a method for increasing a quality of sampled receive signals with the following steps indicated by bullet dashes:

A set $I \subset \mathbb{N}$ and a plurality of sampling signal repetition rates $f_{A,W,i}$ with a running variable i for all i∈I are generated by the controller. Namely, a starting sampling signal repetition rate $f_{A,W,0}$=1 MHz and an interpolation factor N∈{ $\mathbb{N}$ ≥3} are given. Then, a new set I={i:i∈{1, . . . , N}⊆I and (i+N)∈$\mathbb{P}$ } is determined and then the sampling signal repetition rates are determined according to $f_{A,W,i}$=$f_{A,W,0}$ (1+(i−1)/N) for i∈I.

A receive signal repetition rate associated with each of the sampling signal repetition rates $f_{A,W,i}$ is determined by the controller according to $f_{E,W,i}$=($f_{A,W,i}$·$f_{E,G}$)/($f_{E,G}$−$f_{T,G}$) with $f_{E,W,i}$>$f_{A,W,i}$.

In this step, the following sub-steps indicated by bullet dots are executed for all i∈I:

- The transmit signal generator 8 of the receive signal generator 4 is triggered by the controller 3 with the receive signal repetition rate $f_{E,W,i}$. For this purpose, the controller 3 generates a receive trigger signal sequence $s_{E,T}$ consisting of the receive trigger signals $s_{E,T,F,i}$ and routes it via the receive trigger signal path 13 to the receive signal generator 4 and in this to the transmit signal generator 8. The receive trigger signal sequence $s_{E,T}$ consisting of the receive trigger signals $s_{E,T,F,i}$ is shown in FIG. 3a. The transmit signal generator 8 generates and outputs the transmit signals $s_S$, which form the transmit signal sequence $s_{S,F,i}$, triggered by the triggering. Each of the transmit signals $s_S$ is a Dirac pulse. The transmit signal sequence $s_{S,F,i}$ consisting of the transmit signals $s_S$ is shown in FIG. 3b. The transmit signals $s_S$ are guided from the transmit signal generator 8 to the measuring probe 10 via the signal path 15 and reflected in the measuring probe 10 at the transition 12, thus generating the receive signals 5E. Thus, each of the receive signals $s_E$ is also a Dirac pulse. A time interval between one of the transmit signals $s_S$ and the receive signal $s_E$ generated by this transmit signal is Δt and represents a transit time of the signals, from which the controller 3 determines a fill level of the medium 11. The receive signals $s_E$ propagate in the opposite direction to the propagation direction of the transmit signals $s_S$. The receive signals $s_E$ are decoupled from the signal path 15 by the coupler 9 and guided to the mixer 6. In this way, the receive signal sequence $s_{E,F,i}$ consisting of the receive signals $s_E$ is generated. The receive signal sequence $s_{E,F,i}$ consisting of the receive signals $s_E$ is shown in FIG. 3c.

- The controller 3 triggers the sampling signal generator 5 with the sampling signal repetition rate $f_{A,W,i}$. For this, a sampling trigger signal sequence $s_{A,T}$ consisting of the sampling trigger signals $s_{A,T,F,i}$ is generated by the controller 3 and guided to the sampling signal generator 5 via the sampling trigger signal path 14. The sampling trigger signal sequence $s_{A,T}$ consisting of the sampling trigger signals $s_{A,T,F,i}$ is shown in FIG. 3d. The sampling signal generator 5 generates and outputs the sampling signals $s_A$, which form the sampling signal sequence $s_{A,F,i}$, triggered by the triggering. Each of the sampling signals is a Dirac pulse. The sampling signals are guided from the sampling signal generator 5 to the mixer 6 via the sampling signal path 16. The sampling signal sequence $s_{A,F,i}$ consisting of the sampling signals $s_A$ is shown in FIG. 3e.

- The mixer 6 mixes the receive signal sequence $s_{E,F,i}$ and the sampling signal sequence $s_{A,F,i}$ with each other. This generates the mixed signal sequence $s_{M,i}$. The mixed signal sequence is guided via the mixed signal path 17 from the mixer 6 to the low-pass filter 7.

- The mixed signal sequence $s_{M,i}$ is low-pass filtered by the low-pass filter 7. The low-pass filtered mixed signal sequence $s_{F,i}$ is guided via the low-pass signal path 18 from the low-pass filter 7 to the controller 3. The low-pass filtered mixed signal sequence $s_{F,i}$ is shown in FIG. 3f.

- The quality indicator $Q_i$ of the low-pass filtered mixed signal sequence $s_{F,i}$ is determined by the controller.

The controller selects a quality indicator $Q_i$ from the determined quality indicators that exceeds the specified quality threshold. Then, the sampling signal repetition rate and receive signal repetition rate associated with this quality indicator are used.

The individual signals in the signal sequences shown in FIGS. 3a, 3b, 3c, 3d and 3e are spaced further apart in time than is shown in the figures. Accordingly, the temporal representation of the signal sequences is not to scale. The signals of the signal sequences shown in FIGS. 3b, 3c and 3e are Dirac pulses. Accordingly, the representation of the signals is not true to scale.

For I={1, 2, 3, 4} and N=4, the following results:

The new set I is {i:i∈{1, . . . , 4}⊆I and (i+4)∈$\mathbb{P}$ }={i:1, 3}, since only for i∈{1, 3} according to (i+N) prime numbers arise, namely {5, 7}.

The first sampling signal repetition rate is $f_{A,W,1}$=1,000,000 Hz and the first receive signal repetition rate is $f_{E,W,1}$=1,000,004 Hz. The second sampling signal repetition rate is $f_{A,W,3}$=1,500,000 Hz and the second receive signal repetition rate is $f_{E,W,3}$=1,500,006 Hz.

In practice, however, sets I with more elements and larger interpolation factors N are usually used, for example I={1, 2, 3, 4, . . . , 60} and N=60. With these, the following results:

The new set I is {i:i∈{1, . . . , 60}⊆I and (i+60)∈$\mathbb{P}$ }={i:1, 7, 11, . . . }. Further, only the subset {i:1, 7, 11} of I is used. The prime numbers belonging to this subset are {61, 67, 71}.

The first sampling signal repetition rate is $f_{A,W,1}$=1,000,000 Hz and the first receive signal repetition rate is $f_{E,W,1}$=1,000,004 Hz. The second sampling signal repetition rate is $f_{A,W,7}$=1,100,000 and the second receive signal repetition rate is $f_{E,W,7}$=1,100,004.4 Hz. The third sampling signal repetition rate is $f_{A,W,11}$=1,166,666.7 Hz and the third receive signal repetition rate is $f_{E,W,11}$=1,166671.3 Hz.

Just using this subset of I is sufficient to be able to mask out an interference signal with near certainty, since an interference signal with a frequency $f_D$ with a frequency spacing of 61·67·71·1 MHz=290.177·1 MHz is present for all three elements of I.

The invention claimed is:

1. A method for increasing a quality of sampled receive signals with a signal processing device having a controller, a receive signal generator for generating receive signals with an upper receive signal cut-off frequency $f_{E,G}$, a sampling signal generator for generating sampling signals, a mixer and a low-pass filter with a low-pass cut-off frequency $f_{T,G}$, the method comprising:

the controller generating a set $I \subset \mathbb{N}$ and a plurality of sampling signal repetition rates $f_{A,W,i}$ with a running variable i for all i∈I;

the controller determining a receive signal repetition rate associated with each of the sampling signal repetition rates $f_{A,W,i}$ with a factor $c=f_{E,G}/(f_{E,G}-f_{T,G})$ either according to $f_{E,W,i}\approx c\cdot f_{A,W,i}$ or according to $f_{E,W,i}\approx 1/c\cdot f_{A,W,i}$ with $f_{E,W,i}\neq f_{A,W,i}$;

wherein the steps generating a receive signal sequence consisting of the receive signals in that the receive signal generator is triggered with the receive signal repetition rate $f_{E,W,i}$ by the controller;

generating a sampling signal sequence consisting of the sampling signals in that the sampling signal generator is triggered with the sampling signal repetition rate $f_{A,W,i}$ by the controller;

generating a mixed signal sequence in that the receive signal sequence and the sampling signal sequence are mixed with one another by the mixer;

low-pass filtering the mixed signal sequence by the low-pass filter; and determining a quality indicator of the low-pass filtered mixed signal sequence by the controller;

are executed for all $i \in I$; and the controller then selecting a quality indicator which exceeds a predetermined quality threshold from the determined quality indicators; and subsequently using the sampling signal repetition rate $f_{A,W,i}$ and the receive signal repetition rate $f_{E,W,i}$ associated therewith.

2. The method according to claim 1, wherein a start sampling signal repetition rate $f_{A,W,0}$ and an interpolation factor $N\in\{\mathbb{N}\geq 3\}$ are predetermined, wherein a new set $I=\{i:i\in\{1,\ldots,N\}\subseteq I$ and $(i+N)\in\mathbb{P}\}$ is determined, and wherein then the sampling signal repetition rates according to $f_{A,W,i}=f_{A,W,0}(1+(i-1)/N)$ are determined only for i for all $i\in I$.

3. The method according to claim 1, wherein a start sampling signal repetition rate $f_{A,W,0}$ and an interpolation factor $N\in\{\mathbb{N}\geq 3$ and $N\in\mathbb{P}\}$ are predetermined, wherein a new set $I=\{i:i\in\{1,\ldots,N\}\subseteq I\}$ is determined and then the sampling signal repetition rates according to $f_{A,W,i}=f_{A,W,0}(1+(i-1)/N)$ are determined only for i for all $i\in I$.

4. The method according to claim 1, wherein each of the receive signals is a pulse and/or each of the sampling signals is/are Dirac pulses.

5. The method according to claim 1, wherein each of the quality indicators is a signal-to-noise ratio of the low-pass filtered mixed signal sequence.

6. The method according to claim 1, wherein the receive signal generator has a transmit signal generator for generating and transmitting transmit signals and a measuring probe;

wherein the measuring probe is designed for guiding the transmit signals and the receive signals and for generating the receive signals by reflection of the transmit signals at a transition of the measuring probe to a medium; and wherein the transmit signals are generated and transmitted by the transmit signal generator, wherein the transmit signals are first guided by the measuring probe to the transition at which the receive signals are generated by reflection, and then the receive signals are guided back via the measuring probe.

7. A measuring device for time domain reflectometry, comprising:

a signal processing device;

having a controller, a receive signal generator for generating receive signals with an upper receive signal cut-off frequency $f_{E,G}$, a sampling signal generator for generating sampling signals, a mixer and a low-pass filter with a low-pass cut-off frequency $f_{T,G}$;

wherein the receive signal generator has a transmit signal generator for generating and transmitting transmit signals and a measuring probe;

wherein the measuring probe is designed for guiding the transmit signals and the receive signals and for generating the receive signals by reflection of the transmit signals at a transition of the measuring probe to a medium;

wherein the controller is designed to generate a set $I\subset\mathbb{N}$ and a plurality of sampling signal repetition rates $f_{A,W,i}$ with a running variable i for all $i\in I$; and determine a receive signal repetition rate associated with each of the sampling signal repetition rates $f_{A,W,i}$ with a factor $c=f_{E,G}/(f_{E,G}-f_{T,G})$ either according to $f_{E,W,i}=c\cdot f_{A,W,i}$ or according to $f_{E,W,i}=1/c\cdot f_{A,W,i}$ with $f_{E,W,i}\neq f_{A,W,i}$, wherein the controller is further designed for all $i\in I$;

generate a receive signal sequence consisting of the receive signals by triggering the receive signal generator with the receive signal repetition rate $f_{E,W,i}$;

generate a sampling signal sequence consisting of the sampling signals by triggering the sampling signal generator with the sampling signal repetition rate $f_{A,W,i}$;

determine a quality indicator from a mixed signal sequence low-pass filtered by the low-pass filter, wherein the mixed signal sequence is generated by the mixer by mixing the receive signal sequence and the sampling signal sequence; and wherein the controller is further designed to then select, from the determined quality indicators, a quality indicator which exceeds a predetermined quality threshold, and to subsequently use the sampling signal repetition rate $f_{A,W,i}$ and the receive signal repetition rate $f_{E,W,i}$ associated therewith.

8. The measuring device according to claim 7, wherein at least one of:

a start sampling signal repetition rate $f_{A,W,0}$ and an interpolation factor $N\in\{\mathbb{N}\geq 3\}$ are predetermined, wherein a new set $I=\{i:i\in\{1,\ldots,N\}\subseteq I$ and $(i+N)\in\mathbb{P}\}$ is determined, and wherein then the sampling signal repetition es according to $f_{A,W,i}=f_{A,W,0}(1+(i-1)/N)$ et only for i for all $i\in I$;

a start sampling signal repetition rate $f_{A,W,0}$ and an interpolation factor $N\in\{\mathbb{N}\geq 3$ and $N\in\mathbb{P}\}$ are predetermined, wherein a new set $I=\{i:i\in\{1,\ldots,N\}\subset I\}$ is determined and wherein then the sampling signal repetition rates according to $f_{A,W,i}=f_{A,W,0}(1+(i-1)/N)$ are determined only for i for all $i\in I$ each of the receive signals is a pulse and/or each of the sampling signals is/are Dirac pulses;

each of the quality indicators is a signal-to-noise ratio of the low pass filtered mixed signal sequence;

the receive signal generator has a transmit signal generator for generating and transmitting transmit signals and a measuring probe;

the measuring probe is designed for guiding the transmit signals and the receive signals and for generating the receive signals by reflection of the transmit signals at a transition of the measuring probe to a medium; and the transmit signals are generated and transmitted by the transmit signal generator wherein the transmit signals are first guided by the measuring probe to the transition at which the receive signals are generated by reflection, and then the receive signals are guided back via the measuring probe.

9. The measuring device according to claim 7, wherein the measuring device is a level measuring device and the measuring probe is a level measuring probe.

\* \* \* \* \*